(12) United States Patent
Preisler et al.

(10) Patent No.: US 12,248,206 B2
(45) Date of Patent: Mar. 11, 2025

(54) INTEGRATION OF OPTOELECTRONIC DEVICES COMPRISING LITHIUM NIOBATE OR OTHER POCKELS MATERIALS

(71) Applicant: Newport Fab, LLC, Newport Beach, CA (US)

(72) Inventors: Edward Preisler, San Clemente, CA (US); Oleg Martynov, Lebanon, NH (US)

(73) Assignee: Newport Fab, LLC, Newport Beach, CA (US)

( * ) Notice: Subject to any disclaimer, the term of this patent is extended or adjusted under 35 U.S.C. 154(b) by 274 days.

(21) Appl. No.: 17/975,090

(22) Filed: Oct. 27, 2022

(65) Prior Publication Data
US 2024/0142809 A1 May 2, 2024

(51) Int. Cl.
*G02F 1/035* (2006.01)
*G02B 6/136* (2006.01)
*G02B 6/12* (2006.01)

(52) U.S. Cl.
CPC ............. *G02F 1/035* (2013.01); *G02B 6/136* (2013.01); *G02B 2006/1204* (2013.01)

(58) Field of Classification Search
CPC ....................................................... G02F 1/035
See application file for complete search history.

(56) References Cited

U.S. PATENT DOCUMENTS

| 2023/0244034 A1* | 8/2023 | Malik | G02B 6/1228 385/14 |
| 2023/0366913 A1* | 11/2023 | Kamineni | G01J 5/06 |

* cited by examiner

*Primary Examiner* — Chad H Smith
(74) *Attorney, Agent, or Firm* — Farjami & Farjami LLP (57) ABSTRACT

A method of integrating an optoelectronic device comprising a Pockels material, such as lithium niobate (LiNbO3), includes forming an optoelectronic device layer over a semiconductor layer. The optoelectronic device layer includes a patterned optoelectronic device segment in an interlayer dielectric. A window is etched in the interlayer dielectric using the patterned optoelectronic device segment as a sacrificial etch stop. The patterned optoelectronic device segment is removed in the window. The optoelectronic device comprising the Pockels material is formed in place of the removed patterned optoelectronic device segment. The optoelectronic device comprising the Pockels material may be formed from an optoelectronic chiplet.

19 Claims, 8 Drawing Sheets

INTEGRATION OF OPTOELECTRONIC DEVICES COMPRISING LITHIUM NIOBATE OR OTHER POCKELS MATERIALS

BACKGROUND

Optoelectronic devices are commonly utilized in data communications and other fields such as imaging and health care. Various applications of optoelectronic devices, such as modulators, interferometers, and optical switches, can utilize an electro-optical effect to affect changes in optical properties (such as phase, amplitude, wavelength, polarization, etc.). In one approach, optoelectronic devices are formed from a layer of semiconductor material.

However, conventional semiconductor-based optoelectronic devices may not exhibit electro-optical effects as strongly as optoelectronic devices based on other materials. Moreover, conventional semiconductor-based optoelectronic devices may be less efficient, requiring relatively high power consumption in order to achieve a desired degree of change in optical properties. Integrating materials with stronger electro-optical effects often require specialized processing, and may not be practical.

Thus, there is a need in the art for means to integrate optoelectronic devices with strong electro-optical effects without sacrificing manufacturing conveniences.

SUMMARY

The present disclosure is directed to integration of an optoelectronic device comprising lithium niobate (LiNbO3) or other Pockels material, substantially as shown in and/or described in connection with at least one of the figures, and as set forth in the claims.

DETAILED DESCRIPTION

The following description contains specific information pertaining to implementations in the present disclosure. The drawings in the present application and their accompanying detailed description are directed to merely exemplary implementations. Unless noted otherwise, like or corresponding elements among the figures may be indicated by like or corresponding reference numerals. Moreover, the drawings and illustrations in the present application are generally not to scale, and are not intended to correspond to actual relative dimensions.

Figure 1:
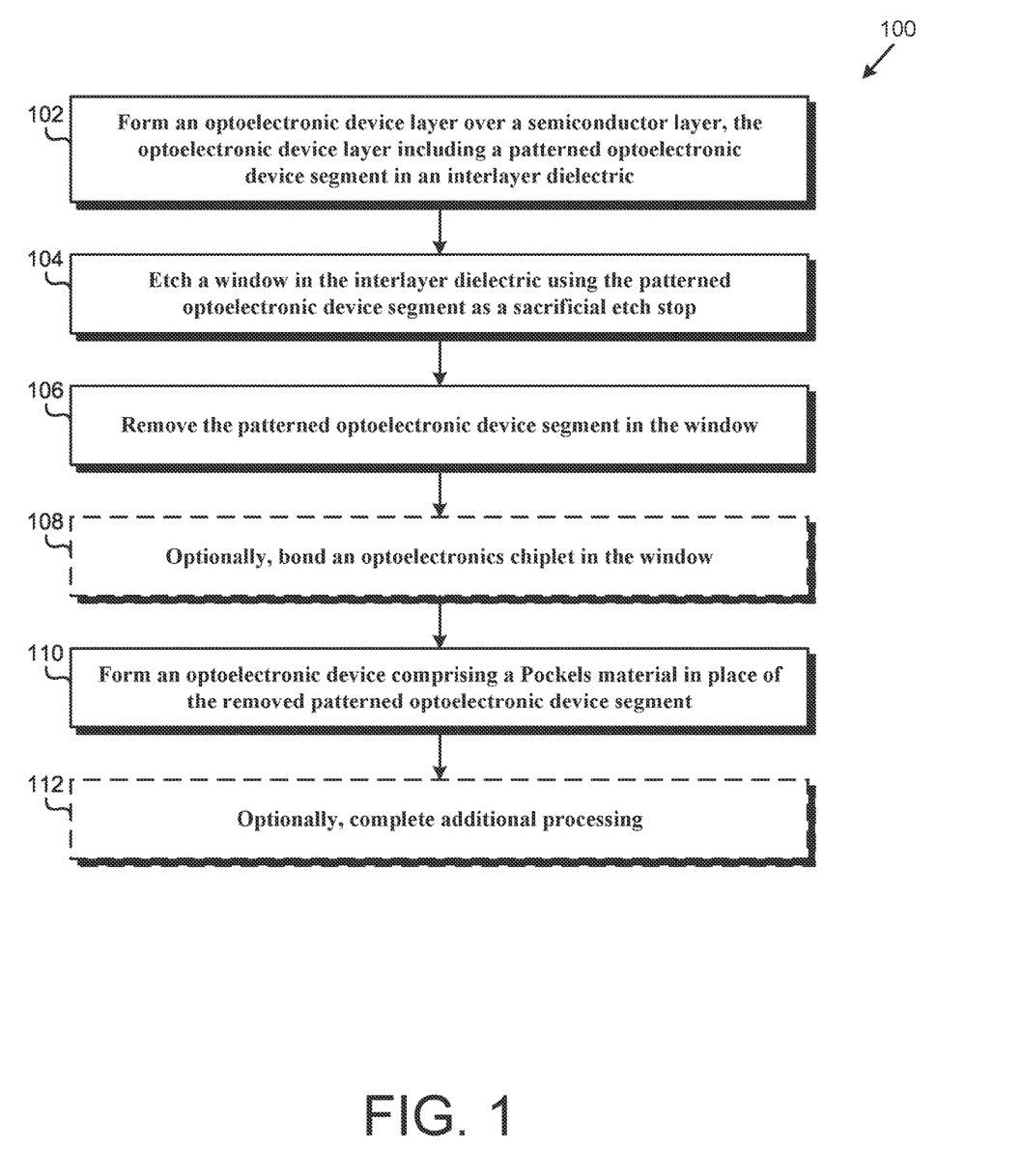
FIG. 1 illustrates a flowchart of an exemplary method for forming a photonics structure according to one implementation of the present application.
Figure 2:
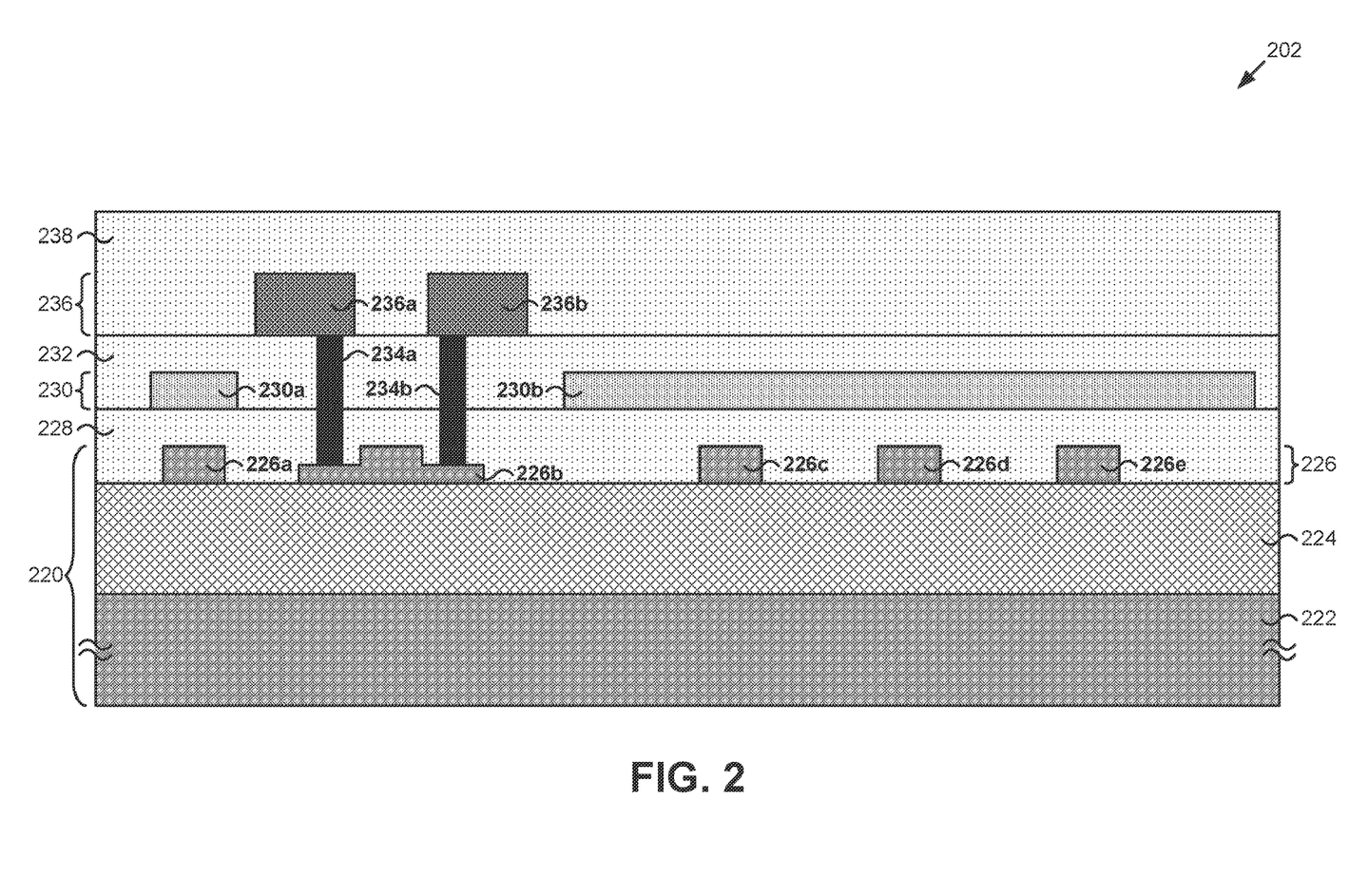
FIG. 2 illustrates a photonics structure processed in accordance with the flowchart of FIG. 1 according to one implementation of the present application.
Figure 3:
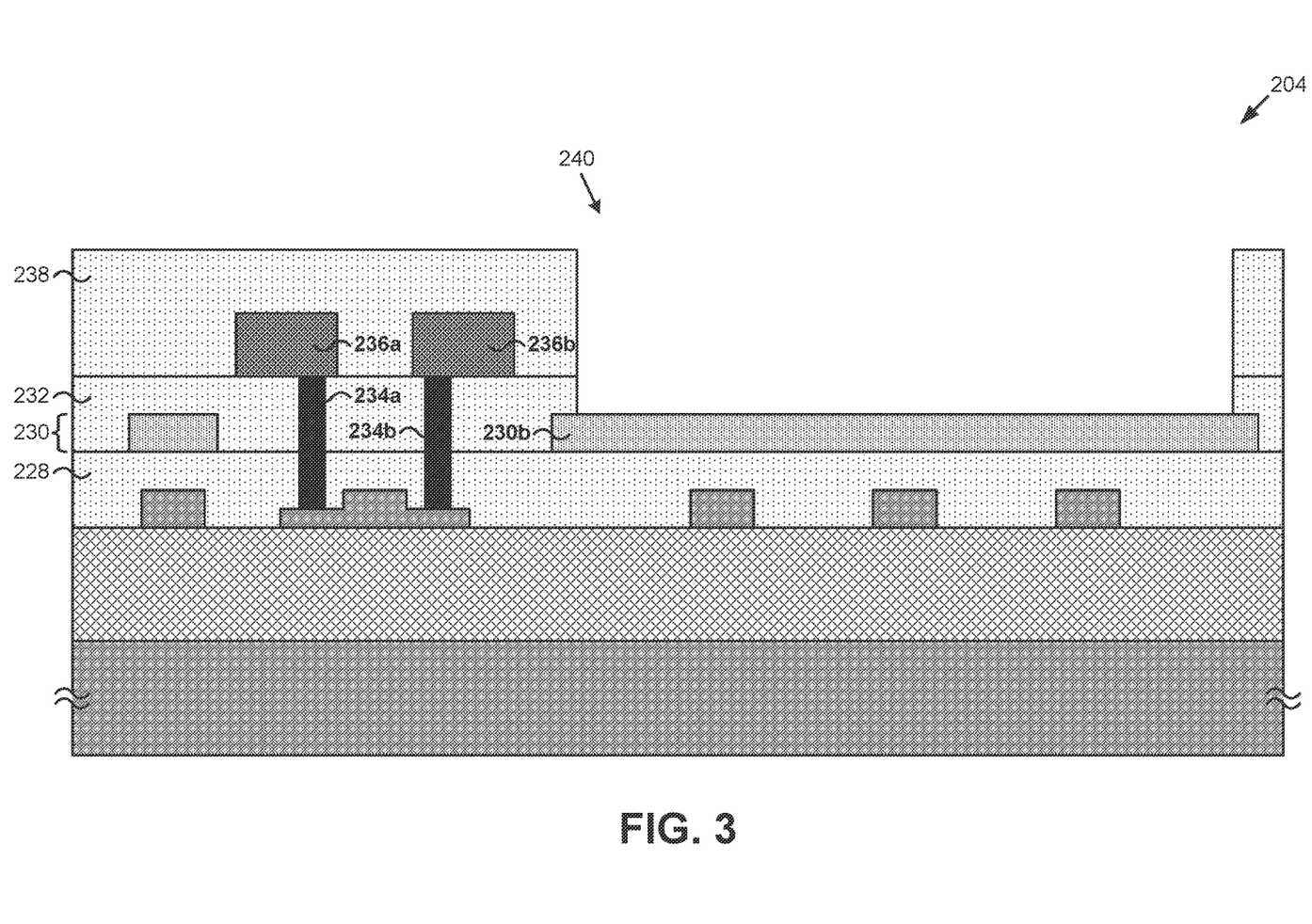
FIG. 3 illustrates a photonics structure processed in accordance with the flowchart of FIG. 1 according to one implementation of the present application.

FIG. 1 illustrates a flowchart of an exemplary method for forming a photonics structure according to one implementation of the present application. Structures shown in FIGS. 2 through 8 illustrate the results of performing actions 102 through 114 shown in flowchart 100 of FIG. 1. For example, FIG. 2 shows a photonics structure after performing action 102 in FIG. 1, FIG. 3 shows a photonics structure after performing action 104 in FIG. 1, and so forth.

Actions 102 through 114 shown in flowchart 100 of FIG. 1 are sufficient to describe one implementation of the present inventive concepts. Other implementations of the present inventive concepts may utilize actions different from those shown in the flowchart of FIG. 1. Certain details and features have been left out of the flowchart that are apparent to a person of ordinary skill in the art. For example, an action may consist of one or more sub-actions or may involve specialized equipment or materials, as known in the art. Moreover, some actions, such as masking and cleaning actions, are omitted so as not to distract from the illustrated actions.

FIG. 2 illustrates a photonics structure processed in accordance with action 102 in the flowchart of FIG. 1 according to one implementation of the present application. As shown in FIG. 2, in photonics structure 202, optoelectronic device layer 230 is formed over semiconductor layer 226. Optoelectronic device layer 230 includes patterned optoelectronic device segment 230b in interlayer dielectric 232.

Photonics structure 202 in FIG. 2 includes substrate 220 having handle wafer 222, buried oxide (BOX) 224, and semiconductor layer 226, optoelectronic devices 226a, 226b, 226c, 226d, and 226e, interlayer dielectric 228, optoelectronic device layer 230, optoelectronic device 230a, optoelectronic device segment 230b, interlayer dielectric 232, contacts 234a and 234b, interconnect metal layer 236, interconnect metal segments 236a and 236b, and interlayer dielectric 238.

In the present implementation, substrate 220 is a semiconductor-on-insulator (SOI) substrate including handle wafer 222, BOX 224, and semiconductor layer 226. In providing substrate 220, a bonded and etch back SOI (BESOI) process can be used, as known in the art. In a BESOI process, handle wafer 222, BOX 224, and semiconductor layer 226 together form an SOI substrate. Alternatively, as also known in the art, a SIMOX process (separation by implantation of oxygen process) or a "smart cut" process can also be used for providing substrate 220. In a SIMOX process, handle wafer 222 can be a bulk silicon support wafer (which for ease of reference, may still be referred to as a "handle wafer" in the present application). Similar to a BESOI process, in both SIMOX and smart cut processes, handle wafer 222, BOX 224, and semiconductor layer 226 together form an SOI substrate.

In one implementation, handle wafer 222 is undoped bulk silicon. In various implementations, handle wafer 222 can comprise germanium, group III-V material, or any other suitable handle material. In various implementations, handle wafer 222 has a thickness of approximately seven hundred microns (700 μm) or greater or less. In one implementation, a trap rich layer can be situated between handle wafer 222 and BOX 224. In various implementations, BOX 224 typically comprises silicon dioxide ($SiO_2$), but it may also comprise silicon nitride ($Si_XN_Y$), or another insulator material. In various implementations, BOX 224 has a thickness of approximately one micron (1 μm) or greater or less. In one implementation, semiconductor layer 226 includes monocrystalline silicon. In various implementations, semiconductor layer 226 can comprise germanium, group III-V material, or any other semiconductor material. In various implementations, semiconductor layer 226 has a thickness of approximately three hundred nanometers (300 nm) or greater or less. Handle wafer 222, BOX 224, and semiconductor layer 226 can be provided together in photonics structure 202 as a pre-fabricated SOI substrate. In various implementations, substrate 220 may be another type of substrate other than an SOI substrate.

Semiconductor layer 226 includes optoelectronic devices 226a, 226b, 226c, 226d, and 226e. Optoelectronic devices 226a, 226b, 226c, 226d, and 226e can be any devices configured to generate, receive, transmit, or modify light. In various implementations, optoelectronic devices 226a, 226b, 226c, 226d, and 226e can include a waveguide, a modulator, a grating coupler, an interferometer, a photodiode, or a phototransistor. For example, optoelectronic device 226a can be a waveguide, optoelectronic device 226b can be a modulator, and optoelectronic devices 226c, 226d, and 226e can be waveguides or arms of an interferometer, modulator, or coupler. Optoelectronic devices 226a, 226b, 226c, 226d, and 226e can be formed, for example, by patterning, doping, and/or performing other processing on semiconductor layer 226 of substrate 220. In various implementations, semiconductor layer 226 can include other devices (not shown in FIG. 2), such as a transistor, an operational amplifier, a driver, a filter, a mixer, or a diode.

Interlayer dielectric 228 is situated over substrate 220. In particular, interlayer dielectric 228 is situated over semiconductor layer 226 and over optoelectronic devices 226a, 226b, 226c, 226d, and 226e. Interlayer dielectric 228 aids formation and processing of back-end-of-line (BEOL) components, such as additional optoelectronic devices, integrated passive devices (IPDs), metal interconnect segments, contacts/vias, and bond pads. In various implementations, interlayer dielectric 228 can comprise borophosphosilicate glass (BPSG), tetra-ethyl ortho-silicate (TEOS), $SiO_2$, $Si_XN_Y$, silicon oxynitride ($Si_XO_YN_Z$), or another dielectric. Interlayer dielectric 228 can be formed by depositing and planarizing a dielectric layer.

Optoelectronic device layer 230 is formed over semiconductor layer 226 on interlayer dielectric 228. Optoelectronic device layer 230 includes optoelectronic device 230a and patterned optoelectronic device segment 230b. Optoelectronic device 230a and patterned optoelectronic device segment 230b are optoelectronic devices not comprising Pockels material, as described below. Optoelectronic device layer 230 can also be a different material than semiconductor layer 226, which can be more advantageous for a given application. For example, optoelectronic device layer 230 can provide lower optical propagation losses at typical telecommunications wavelengths, such as wavelengths of 1310 nm to 1550 nm, and/or at visible wavelengths, such as wavelengths of 400 nm to 700 nm.

In one implementation, optoelectronic device layer 230 is a $Si_XN_Y$ layer, optoelectronic device 230a is a $Si_XN_Y$ waveguide, and patterned optoelectronic device segment 230b is a $Si_XN_Y$ segment. In the present implementation, optoelectronic device 230a in optoelectronic device layer 230 overlies optoelectronic device 226a in semiconductor layer 226. Optoelectronic device 230a can be configured to optically couple to, modulate, or otherwise interact with optoelectronic device 226a. Patterned optoelectronic device segment 230b is a patterned segment having the same material as optoelectronic device 230a, which could otherwise be utilized to form another optoelectronic device. In the present implementation, patterned optoelectronic device segment 230b in optoelectronic device layer 230 is significantly wider than optoelectronic device 230a, and patterned optoelectronic device segment 230b overlies optoelectronic devices 226c, 226d, and 226e in semiconductor layer 226. Optoelectronic device layer 230 can include more optoelectronic devices and/or more patterned optoelectronic device segments than shown in FIG. 2.

Optoelectronic device 230a and patterned optoelectronic device segment 230b are situated in and under interlayer dielectric 232. Interlayer dielectric 232 separates optoelectronic device layer 230 from first interconnect metal layer 236 (M1). In various implementations, interlayer dielectric 232 can comprise $SiO_2$, $Si_XN_Y$, or $Si_XO_YN_Z$. Interlayer dielectric 232 can be formed in a similar manner to interlayer dielectric 228, as described above. Although interlayer dielectric 232 is illustrated as a single dielectric layer in FIG. 2, an interlayer dielectric can be a combination of multiple dielectric layers.

Contacts 234a and 234b are situated in interlayer dielectrics 228 and 232. Contacts 234a and 234b connect optoelectronic device 226b in semiconductor layer 226 to interconnect metal segments 236a and 236b, respectively, in first interconnect metal layer 236 (M1). In one implementation, contact holes are etched in interlayer dielectrics 228 and 232 over optoelectronic device 226b, a metal is deposited in the contact holes, and then planarized with interlayer dielectric 232, for example, using chemical mechanical polishing (CMP), thereby forming contacts 234a and 234b. In an alternative implementation, a damascene process is used to form contacts 234a and 234b. In various implementations, contacts 234a and 234b can comprise tungsten (W), copper (Cu), or aluminum (Al).

First interconnect metal layer 236 (M1) is provided over interlayer dielectric 232. First interconnect metal layer 236 includes interconnect metal segments 236a and 236b electrically coupled to contacts 234a and 234b respectively. In one implementation, a metal layer is deposited over interlayer dielectric 232 and contacts 234a and 234b, and then segments thereof are etched, thereby forming interconnect metal segments 236a and 236b. In an alternative implementation, a damascene process is used to form interconnect metal segments 236a and 236b. In various implementations, interconnect metal segments 236a and 236b can comprise W, Al, or Cu.

Contacts 234a and 234b and interconnect metal segments 236a and 236b together route electricity to/from optoelectronic device 226b, which can be, for example, a silicon Mach-Zehnder modulator. Although contacts 234a and 234b and interconnect metal segments 236a and 236b are illustrated as separate formations in FIG. 2, in other implementations they may be parts of the same formation. Photonics structure 202 can include other contacts and other interconnect metal segments not shown in FIG. 2. Interconnect metal segments 236a and 236b are situated in and under interlayer dielectric 238. Interlayer dielectric 238 can be formed in a similar manner to interlayer dielectric 232, as described above.

FIG. 3 illustrates a photonics structure processed in accordance with action 104 in the flowchart of FIG. 1 according to one implementation of the present application. As shown in FIG. 3, in photonics structure 204, window 240 is etched in interlayer dielectrics 232 and 238 using patterned optoelectronic device segment 230b as a sacrificial etch stop.

Window 240 can be formed by patterning a lithographic mask on interlayer dielectric 238 to have an opening overlying patterned optoelectronic device segment 230b, then etching through interlayer dielectrics 232 and 238 to optoelectronic device layer 230 using, for example, reactive ion etching (RIE). Patterned optoelectronic device segment 230b performs as a sacrificial etch stop, preventing etching down to interlayer dielectric 228 and/or semiconductor layer 226. An upper portion of patterned optoelectronic device segment 230b can be damaged during etching of window 240. In the present implementation, window 240 is narrower than patterned optoelectronic device segment 230b to prevent window 240 being etched around the sides of patterned optoelectronic device segment 230b down to interlayer dielectric 228 and/or semiconductor layer 226.

Figure 4:
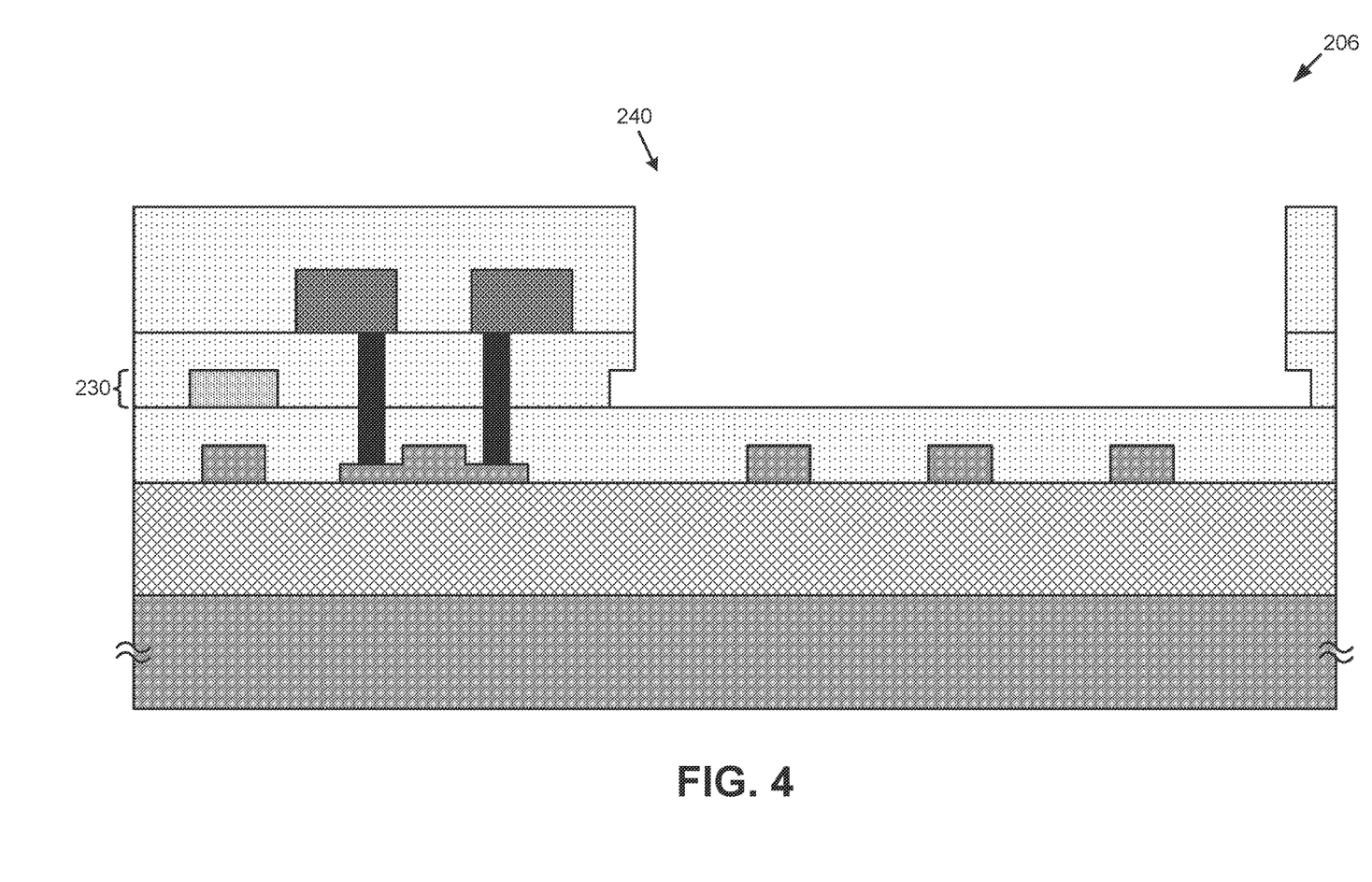
FIG. 4 illustrates a photonics structure processed in accordance with the flowchart of FIG. 1 according to one implementation of the present application.

FIG. 4 illustrates a photonics structure processed in accordance with action 106 in the flowchart of FIG. 1 according to one implementation of the present application. As shown in FIG. 4, in photonics structure 206, patterned optoelectronic device segment 230b (shown in FIG. 3) is removed in window 240.

Patterned optoelectronic device segment 230b (shown in FIG. 3) can be removed using any technique known in the art. In one implementation where patterned optoelectronic device segment 230b (shown in FIG. 3) is $Si_xN_Y$, patterned optoelectronic device segment 230b (shown in FIG. 3) can be removed using a wet etch that is selective to $Si_xN_Y$, such as a phosphoric acid wet etch. Thus, patterned optoelectronic device segment 230b (shown in FIG. 3) can be removed without damaging any interlayer dielectrics around it. After removing patterned optoelectronic device segment 230b (shown in FIG. 3), window 240 is expanded, and an empty space exists in optoelectronic device layer 230 in place of patterned optoelectronic device segment 230b (shown in FIG. 3).

Figure 5:
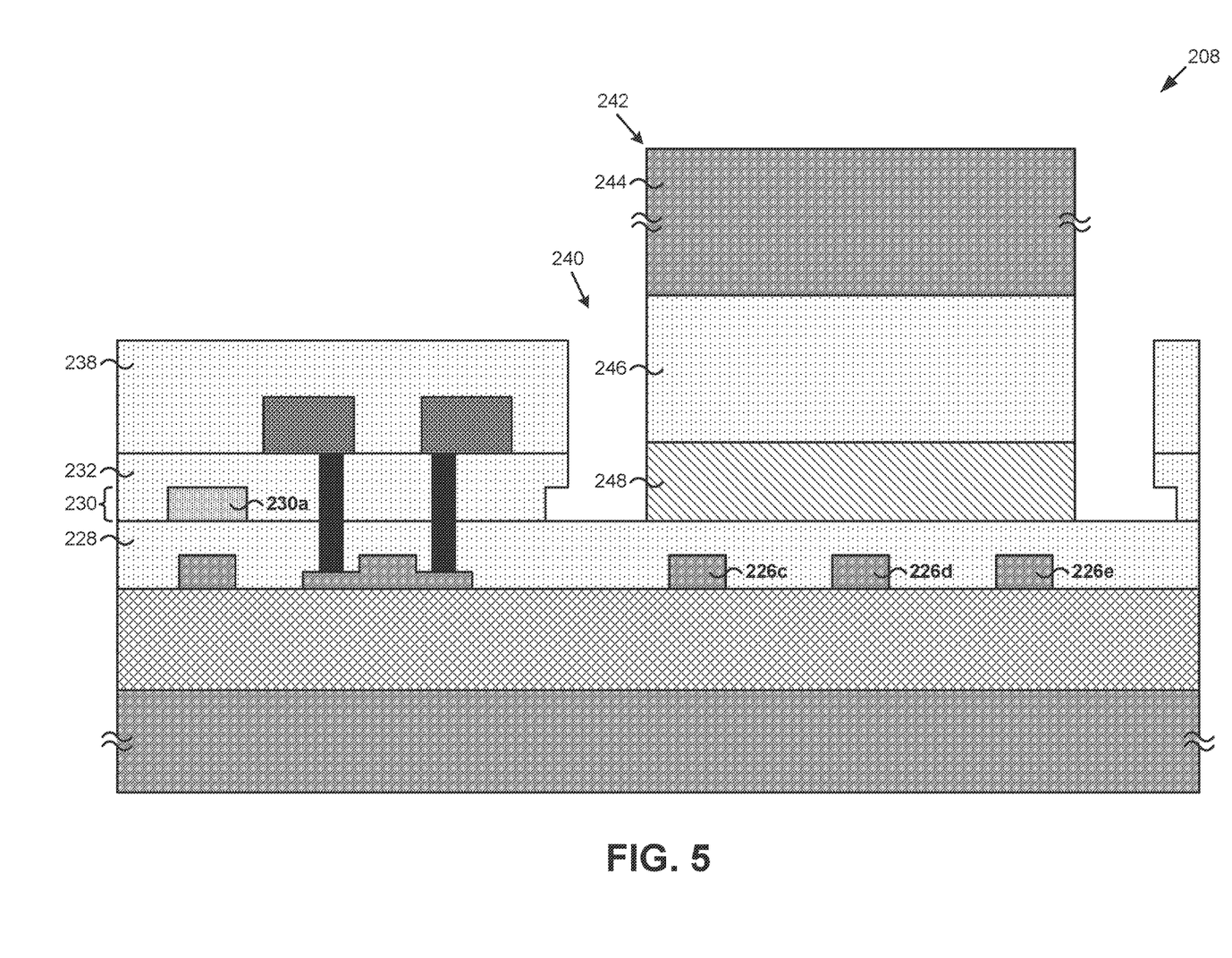
FIG. 5 illustrates a photonics structure processed in accordance with the flowchart of FIG. 1 according to one implementation of the present application.

FIG. 5 illustrates a photonics structure processed in accordance with action 108 in the flowchart of FIG. 1 according to one implementation of the present application. As shown in FIG. 5, in photonics structure 208, optoelectronic chiplet 242 is bonded in window 240.

Optoelectronic chiplet 242 is a chip that is relatively small compared to a traditional wafer, and that includes a Pockels material. As used herein, "Pockels material" refers to any material that exhibits the Pockels effect, whereby the refractive index of a medium changes in response to an applied electric field. In the present implementation, optoelectronic chiplet 242 includes carrier semiconductor layer 244 and dielectric segment 246 supporting Pockels material 248. In various implementations, Pockels material 248 can comprise lithium niobate ($LiNbO_3$), lithium tantalate (LiTa), potassium dihydrogen phosphate (KDP), deuterated potassium dihydrogen phosphate (DKDP), rubidium titanyl phosphate (RTP), potassium titanyl phosphate (KTP), potassium titanyl arsenate (KTA), barium borate (BBO), barium titanate (BTO), ammonium dihydrogen phosphate (ADP), cadmium telluride (CdTe), various organic materials which demonstrate a strong Pockels effect, or any other suitable Pockels material. In various implementations, Pockels material 248 has a thickness between approximately one hundred nanometers and six hundred nanometers (100 nm-600 nm) or greater or less.

Pockels material 248 is situated on dielectric segment 246. In various implementations, dielectric segment 246 can comprise can comprise $SiO_2$, $Si_xN_Y$, $Si_xO_YN_Z$, or any other suitable dielectric. In various implementations, dielectric segment 246 has a thickness between approximately one micron and ten microns (1 μm-10 μm) or greater or less. Dielectric segment 246 is situated on carrier semiconductor layer 244. In various implementations, carrier semiconductor layer 244 can comprise silicon, germanium, or any other suitable handle material. In various implementations, carrier semiconductor layer 244 has a thickness between approximately ten microns and twenty microns (10 μm-20 μm) or greater or less.

In photonics structure 208, optoelectronic chiplet 242 is flipped such that Pockels material 248 is on the bottom, and then optoelectronic chiplet 242 is bonded in window 240. Optoelectronic chiplet 242 can be bonded using any suitable bonding technique. Where an optoelectronic device subsequently formed from Pockels material 248 is configured to interact with optoelectronic devices 226c, 226d, or 226e, chiplet 242 can be bonded without using an adhesive that could interfere with such interaction. In one implementation, optoelectronic chiplet 242 is bonded in window 240 using fusion bonding by contacting Pockels material 248 and interlayer dielectric 228, then applying heat and/or pressure.

After the bonding action, Pockels material 248 is situated in place of patterned optoelectronic device segment 230b (shown in FIG. 3). In the present implementation, optoelectronic chiplet 242 overlies optoelectronic devices 226c, 226d, or 226e. Carrier semiconductor layer 244 and dielectric segment 246 support Pockels material 248 during the bonding action. However, in various implementations, optoelectronic chiplet 242 may omit carrier semiconductor layer 244 and/or dielectric segment 246.

Figure 6:
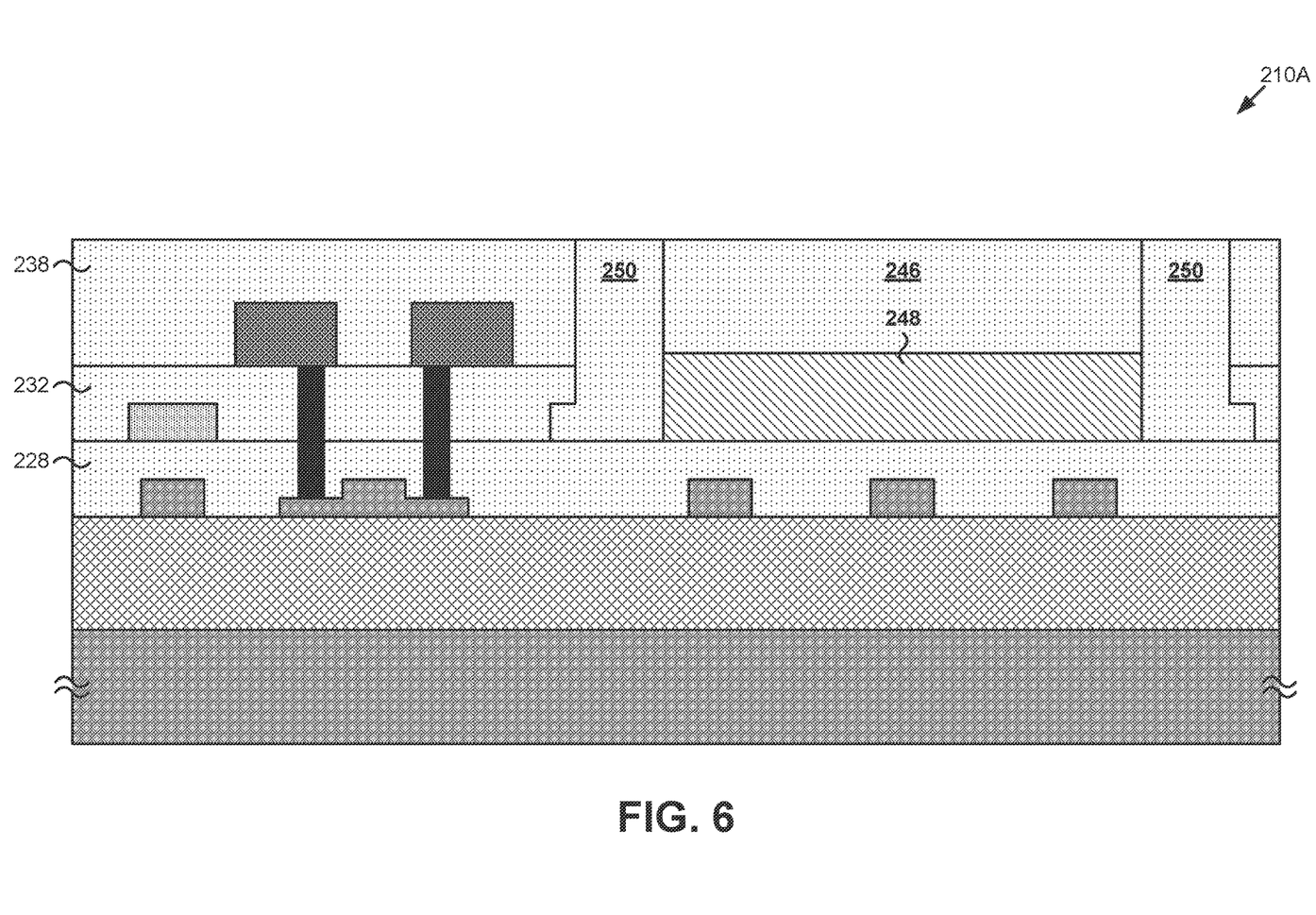
FIG. 6 illustrates a photonics structure processed in accordance with the flowchart of FIG. 1 according to one implementation of the present application.

FIG. 6 illustrates a photonics structure processed in accordance with action 110 in the flowchart of FIG. 1 according to one implementation of the present application. As shown in FIG. 6, in photonics structure 210A, intermediate processing actions for forming an optoelectronic device comprising Pockels material 248 are performed.

Referring to both FIGS. 5 and 6, carrier semiconductor layer 244 is removed from optoelectronic chiplet 242. In one implementation, carrier semiconductor layer 244 can be removed by spinning on photoresist to fill window 240 and cover optoelectronic chiplet 242, opening a window in the photoresist, and etching away carrier semiconductor layer 244 using a wet etch or a dry etch. For example, where carrier semiconductor layer 244 comprises silicon, it can be etched away using sulfur hexafluoride ($SF_6$). The photoresist can then be removed using oxygen plasma. In another implementation, carrier semiconductor layer 244 can be removed by using an etch that is selective to carrier semiconductor layer 244, such that the etch does not damage Pockels material 248 or interlayer dielectrics 228, 232, and 238. For example, where carrier semiconductor layer 244 comprises germanium, it can be selectively etched away using hydrogen peroxide ($H_2O_2$). In this example, since carrier semiconductor layer 244 comprises germanium instead of silicon, it can be removed immediately after bonding optoelectronic chiplet 242 without spinning on photoresist, opening a window in the photoresist, and removing the photoresist. The risk of accidental damage to Pockels material 248 is also mitigated.

After removing carrier semiconductor layer 244, the remainder of window 240 can be filled with a dielectric filler 250, and then dielectric filler 250 can be planarized, for example, using CMP, thereby forming photonics structure 210A shown in FIG. 6. In the present implementation, dielectric filler 250 is situated around sides of Pockels material 248 and around sides of dielectric segment 246, while dielectric segment 246 is situated over Pockels material 248. Dielectric filler 250, dielectric segment 246, and interlayer dielectric 238 have substantially coplanar top surfaces. As used herein, "substantially coplanar" refers to two surfaces being coplanar, except for normal dishing and other normal process variations associated with planarization. In various implementations, dielectric filler 250 can comprise can comprise $SiO_2$, $Si_XN_Y$, $Si_XO_YN_Z$, or any other suitable filler.

Figure 7:
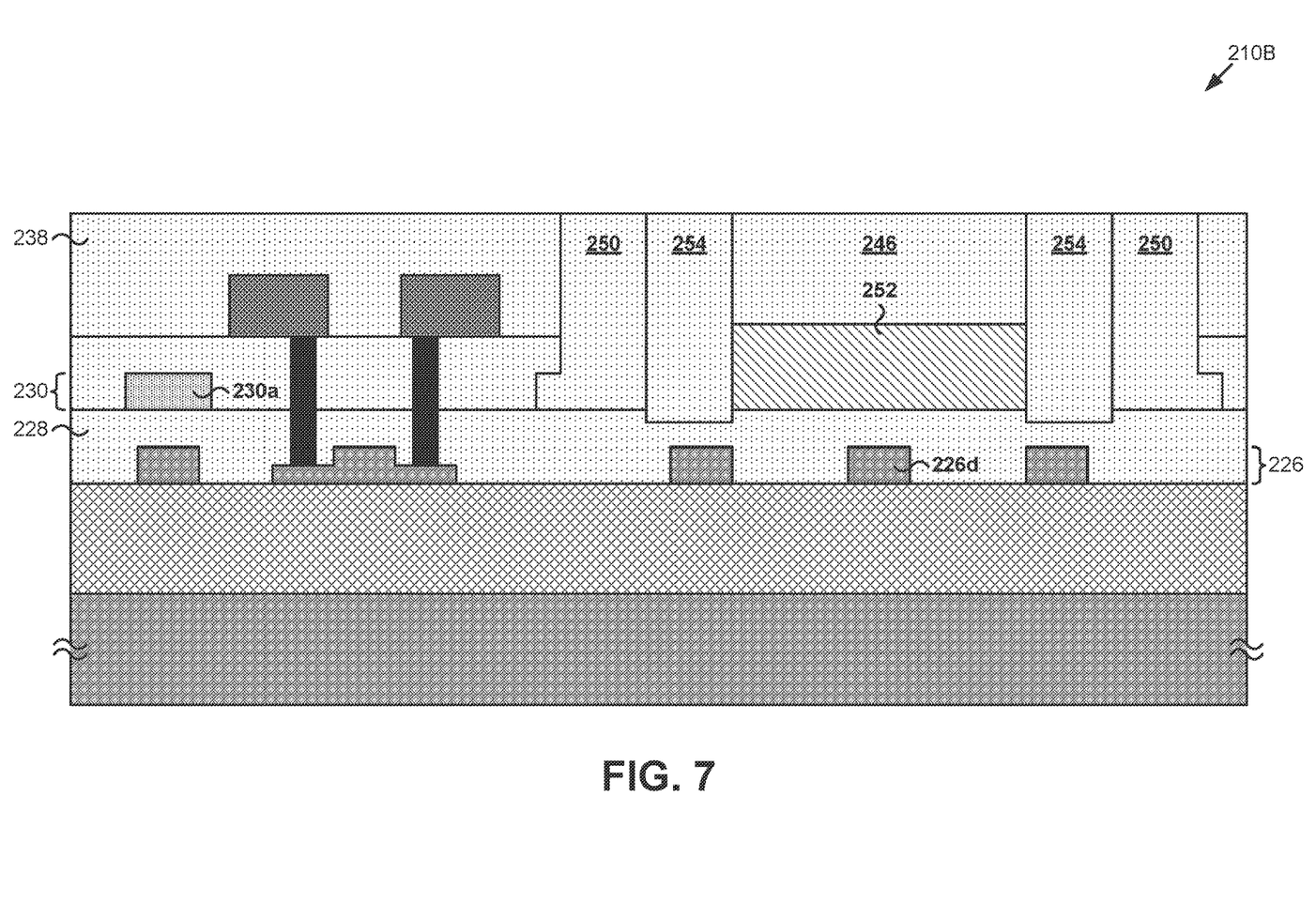
FIG. 7 illustrates a photonics structure processed in accordance with the flowchart of FIG. 1 according to one implementation of the present application.

FIG. 7 illustrates a photonics structure processed in accordance with action 110 in the flowchart of FIG. 1 according to one implementation of the present application. As shown in FIG. 7, in photonics structure 210B, optoelectronic device 252 comprising Pockels material is formed in place of the removed patterned optoelectronic device segment 230b (shown in FIG. 3).

In FIG. 7, optoelectronic device 252 is formed by patterning Pockels material 248 (shown in FIG. 6) through holes in dielectric segment 246. For example, holes can be etched in dielectric segment 246 down to Pockels material 248 (shown in FIG. 6) using carbon tetrafluoride ($CF_4$). Then Pockels material 248 can be patterned through the holes by sputter etching through Pockels material 248 and optionally into interlayer dielectric 228 using argon (Ar).

After forming optoelectronic device 252, the holes are then filled with dielectric filler 254, and then dielectric filler 254 is planarized, for example, using CMP, thereby forming photonics structure 210B shown in FIG. 7. In the present implementation, dielectric filler 254 is situated around sides of optoelectronic device 252 comprising Pockels material and around sides of dielectric segment 246, while dielectric segment 246 is situated over optoelectronic device 252 comprising Pockels material. Dielectric fillers 254 and 250, dielectric segment 246, and interlayer dielectric 238 have substantially coplanar top surfaces to facilitate subsequent processing actions. Although dielectric fillers 254 and 240 are illustrated as completely filling holes, in other implementations the holes can have voids pinched off by dielectric fillers 254 and 240.

Photonics structure 210B in FIG. 7 includes optoelectronic device 252 comprising Pockels material formed from an optoelectronic chiplet 242 (shown in FIG. 5). Optoelectronic device 252 has Pockels material situated in place of the removed patterned optoelectronic device segment 230b (shown in FIG. 3). As a result, optoelectronic device 252 comprising Pockels material and optoelectronic device 230a not comprising Pockels material are situated at the same level in optoelectronic device layer 230. In particular, optoelectronic device 252 comprising Pockels material and optoelectronic device 230a not comprising Pockels material have substantially coplanar bottom surfaces. As used herein, Pockels material of optoelectronic device 252 being "in place of" the removed patterned optoelectronic device segment 230b (shown in FIG. 3) refers to at least some portion of the Pockels material occupying at least some portion previously occupied by the removed patterned optoelectronic device segment 230b; it does not require that the Pockels material occupy the same dimensions as the removed patterned optoelectronic device segment 230b.

In one implementation, optoelectronic device 252 comprising Pockels material is an electro-optic modulator (EOM). For example, optoelectronic device 252 can be configured to utilize the Pockels effect to modulate light coupled from optoelectronic device 226d below optoelectronic device 252 in semiconductor layer 226. In this implementation, optoelectronic device 252 comprising Pockels material may be a LiNbO3 EOM, and optoelectronic device 226d may be a silicon (Si) waveguide. In another implementation, optoelectronic device 252 comprising Pockels material is a waveguide instead of or in addition to being an EOM.

Figure 8:
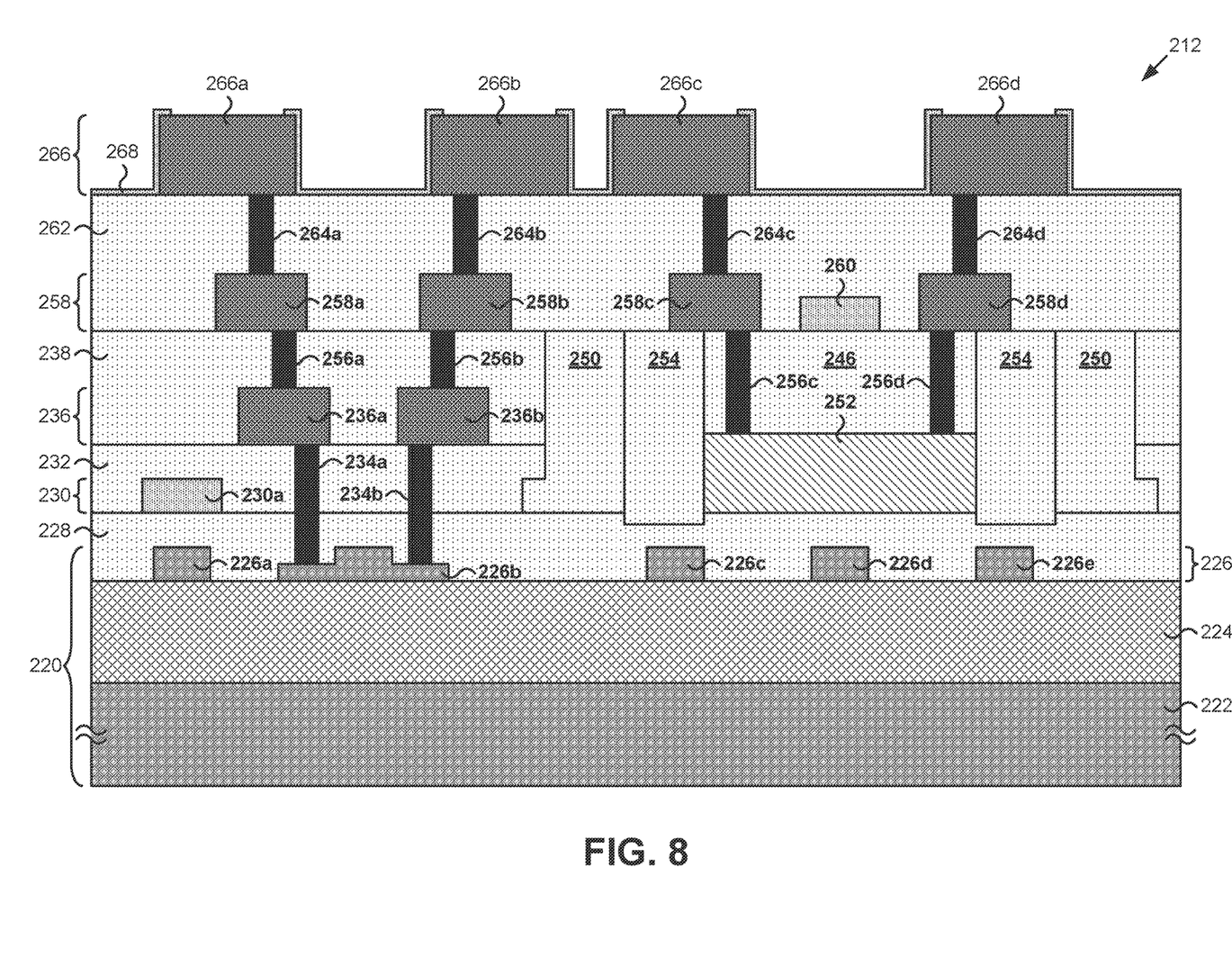
FIG. 8 illustrates a photonics structure processed in accordance with the flowchart of FIG. 1 according to one implementation of the present application.

FIG. 8 illustrates a photonics structure processed in accordance with action 114 in the flowchart of FIG. 1 according to one implementation of the present application. As shown in FIG. 8, in photonics structure 212, additional processing is completed. The additional processing includes forming vias 256a and 256b, contacts 256c and 256d, second interconnect metal layer 258 (M2), interconnect metal segments 258a, 258b, 258c, and 258d, optional optoelectronic device 260, interlayer dielectric 262, vias 264a, 264b, 264c, and 264d, third interconnect metal layer 266 (M3), interconnect metal segments 266a, 266b, 266c, and 266d, and passivation layer 268.

Vias 256a and 256b situated in interlayer dielectric 238, contacts 256c and 256d situated in dielectric segment 246, and vias 264a, 264b, 264c, and 264d situated in interlayer dielectric 262 can be formed in a similar manner to contacts 234a and 234b, as described above. Vias 256a and 256b connect interconnect metal segments 236a and 236b in first interconnect metal layer 236 (M1) to interconnect metal segments 258a and 258b, respectively, in second interconnect metal layer 258 (M2). Vias 264a, 264b, 264c, and 264d connect interconnect metal segments 258a, 258b, 258c, and 258d in second interconnect metal layer 258 (M2) to interconnect metal segments 266a, 266b, 266c, and 266d, respectively, in third interconnect metal layer 266 (M3).

Contacts 256c and 256d situated in dielectric segment 246 are electrically coupled to optoelectronic device 252 comprising Pockels material. Contacts 256c and 256d can apply electricity to optoelectronic device 252 to induce an electric field using the Pockels material. Contacts 256c and 256d to optoelectronic device 252 can be formed concurrently with vias 256a and 256b to interconnect metal segments 236a and 236b.

Second interconnect metal layer 258 (M2) is provided over interlayer dielectric 238, dielectric segment 246, and dielectric fillers 250 and 254. Second interconnect metal layer 258 includes interconnect metal segments 258a, 258b, 258c, and 258d electrically coupled to vias 256a and 256b and contacts 256c and 256d, respectively. Interlayer dielectric 262 is provided over interconnect metal segments 258a, 258b, 258c, and 258d and interlayer dielectric 238. Interlayer dielectric 262 can be formed in a similar manner to interlayer dielectric 238, as described above. Third interconnect metal layer 266 (M3) is provided over interlayer dielectric 262. Third interconnect metal layer 266 includes interconnect metal segments 266a, 266b, 266c, and 266d electrically coupled to vias 264a, 264b, 264c, and 264d, respectively. Interconnect metal segments 258a, 258b, 258c, 258d, 266a, 266b, 266c, and 266d can be formed in a similar manner to interconnect metal segments 236a and 236b, as described above.

Passivation layer 268 is formed over and on sidewalls of interconnect metal segments 266a, 266b, 266c, and 266d, and over interlayer dielectric 262. Passivation layer 268 can be formed by conformal deposition, for example, by physical vapor deposition (PVD) or chemical vapor deposition (CVD) techniques. In various implementations, passivation layer 268 can include a semiconductor-based dielectric such as $Si_XO_Y$, $Si_XN_Y$, or $Si_XO_YN_Z$. In various implementations, passivation layer 324 can have a thickness of approximately fifty angstroms (50 Å) to two hundred angstroms (200 Å). In various implementations, passivation layer 268 comprises multiple passivation layers.

As shown in FIG. 8, windows are formed in passivation layer 268 exposing portions of interconnect metal segments 266a, 266b, 266c, and 266d. Thus, the exposed portions of interconnect metal segments 266a, 266b, 266c, and 266d can function as bond pads for electrical connections external to photonics structure 212.

Contacts 234a and 234b, vias 256a, 256b, 264a, and 264b, and interconnect metal segments 236a, 236b, 258a, 258b, 266a, and 266b together route electricity to/from optoelectronic device 226b, which can be, for example, a silicon Mach-Zehnder modulator. Similarly, contacts 256c and 256d, vias 264c and 264c, and interconnect metal segments 258c, 258d, 266c, and 266d together route electricity to/from optoelectronic device 252 comprising Pockels material, which can be, for example, a LiNbO3 OEM. In various implementations, some contacts, vias, and interconnect metal segment may route to other components in photonics structure 212 instead of or in addition to bond pads at third interconnect metal layer 266 (M3).

Optional optoelectronic device 260 is provided over optoelectronic device 252 on dielectric segment 246. Optional optoelectronic device 260 can be formed in a similar manner to optoelectronic device 230a, as described above. Optoelectronic device 252 comprising Pockels material can be configured to optically couple to, modulate, or otherwise interact with optional optoelectronic device 260 instead of or in addition to optoelectronic device 226d. In other words, optoelectronic device 252 comprising Pockels material can be configured to interact with nearby optoelectronic devices in photonics structure 212, not only optoelectronic devices situated under optoelectronic device 252. In one implementation, optional optoelectronic device 260 is a $Si_XN_Y$ waveguide.

It is noted that, although optoelectronic device 252 is formed by patterning Pockels material 248 in the present implementation, as shown across FIGS. 6 and 7, in other implementations, such patterning may be omitted. For example, referring to FIG. 5, in an implementation where Pockels material 248 of optoelectronic chiplet 242 already has appropriate dimensions to perform as an optoelectronic device, an optoelectronic device comprising Pockels material in place of the removed patterned optoelectronic device segment 230b (shown in FIG. 3) is formed upon bonding of optoelectronic chiplet 242 in window 240 as shown in FIG. 5.

Referring to FIG. 3, it is also noted that, although window 240 is formed in both interlayer dielectrics 232 and 238 after forming contacts 234a and 234b and interconnect metal segments 236a and 236b in the present implementation, other implementations are possible. Namely, optoelectronic device layer 230 including optoelectronic device 252 comprising Pockels material and optoelectronic device 230a not comprising Pockels material can generally be formed at any level in photonics structure 212 in FIG. 8. For example, a window can be formed in only interlayer dielectric 232, and an optoelectronic chiplet can be bonded and processed into and optoelectronic device comprising Pockels material before even forming contacts 234a and 234b or interconnect metal segments 236a and 236b. In such implementation, contacts to the optoelectronic device comprising Pockels material may be formed substantially concurrently with contacts to optoelectronic device 226b.

Photonics structures according to the present invention, such as photonics structure 212 in FIG. 8, can advantageously utilize a patterned optoelectronic device segment 230b in an existing optoelectronic device layer 230 to efficiently integrate optoelectronic device 252 comprising Pockels material and optoelectronic device 230a not comprising Pockels material in the same optoelectronic device layer 230. Where optoelectronic device 252 comprising Pockels material is an electro-optic modulator (EOM), optoelectronic device 252 can modulate light more efficiently than conventional modulators due to relatively strong electro-optical effect of the Pockels material.

Moreover, where optoelectronic device 252 comprising Pockels material is formed from an optoelectronic chiplet, such as optoelectronic chiplet 242 in FIG. 5, it is possible to avoid deposition of a Pockels film, which may be an action not readily performed in a typical foundry, and instead utilize more conventional actions, such as etching, bonding, and patterning. Further, where carrier semiconductor layer 244 of optoelectronic device 252 comprises a material that can be selectively etched, such as germanium, carrier semiconductor layer 244 can be removed immediately after bonding optoelectronic chiplet 242 without introducing, patterning, and removing photoresist, and the risk of damaging Pockels material 248 during removal of carrier semiconductor layer 244 is also mitigated.

From the above description it is manifest that various techniques can be used for implementing the concepts described in the present application without departing from the scope of those concepts. Moreover, while the concepts have been described with specific reference to certain implementations, a person of ordinary skill in the art would recognize that changes can be made in form and detail without departing from the scope of those concepts. As such, the described implementations are to be considered in all respects as illustrative and not restrictive. It should also be understood that the present application is not limited to the particular implementations described above, but many rearrangements, modifications, and substitutions are possible without departing from the scope of the present disclosure.

The invention claimed is:

1. A photonics structure comprising:
   an optoelectronic device layer over a semiconductor layer, said optoelectronic device layer including a first optoelectronic device comprising a Pockels material and a second optoelectronic device not comprising Pockels material;
   at least one dielectric situated over and around said first optoelectronic device comprising said Pockels material;
   a contact electrically coupled to said first optoelectronic device comprising said Pockels material;
   an interconnect metal segment situated over said at least one dielectric and electrically coupled to said contact.

2. The photonics structure of claim 1, wherein said Pockels material is selected from the group consisting of lithium niobate (LiNbO3), lithium tantalate (LiTa), potassium dihydrogen phosphate (KDP), deuterated potassium dihydrogen phosphate (DKDP), rubidium titanyl phosphate (RTP), potassium titanyl phosphate (KTP), potassium titanyl arsenate (KTA), barium borate (BBO), barium titanate (BTO), ammonium dihydrogen phosphate (ADP), and cadmium telluride (CdTe).

3. The photonics structure of claim 1, wherein said second optoelectronic device comprises silicon nitride ($Si_XN_Y$).

4. The photonics structure of claim 1, wherein said first optoelectronic device comprising said Pockels material is an electro-optic modulator.

5. The photonics structure of claim 1, further comprising a third optoelectronic device in said semiconductor layer below said first optoelectronic device comprising said Pockels material.

6. The photonics structure of claim 5, wherein said third optoelectronic device is a silicon (Si) waveguide.

7. The photonics structure of claim 1, wherein said semiconductor layer is a top semiconductor layer of a semiconductor-on-insulator (SOI) substrate.

8. The photonics structure of claim 1, wherein said at least one dielectric comprises a dielectric filler around a side of said Pockels material and a dielectric segment over said Pockels material.

9. The photonics structure of claim 8, wherein said dielectric filler and said dielectric segment have substantially coplanar top surfaces.

10. A photonics structure comprising:
an optoelectronic device layer over a semiconductor layer, said optoelectronic device layer including a first optoelectronic device comprising a Pockels material and a second optoelectronic device not comprising Pockels material;
at least one dielectric situated over said first optoelectronic device comprising said Pockels material;
a contact electrically coupled to said first optoelectronic device comprising said Pockels material;
an interconnect metal segment electrically coupled to said contact.

11. The photonics structure of claim 10, wherein said Pockels material is selected from the group consisting of lithium niobate (LiNbO3), lithium tantalate (LiTa), potassium dihydrogen phosphate (KDP), deuterated potassium dihydrogen phosphate (DKDP), rubidium titanyl phosphate (RTP), potassium titanyl phosphate (KTP), potassium titanyl arsenate (KTA), barium borate (BBO), barium titanate (BTO), ammonium dihydrogen phosphate (ADP), and cadmium telluride (CdTe).

12. The photonics structure of claim 10, wherein said first optoelectronic device and said second optoelectronic device have substantially coplanar bottom surfaces further including a second optoelectronic device not comprising Pockels material.

13. The photonics structure of claim 12, wherein said second optoelectronic device comprises silicon nitride ($Si_xN_y$).

14. The photonics structure of claim 10, wherein said first optoelectronic device comprising said Pockels material is an electro-optic modulator.

15. The photonics structure of claim 12, further comprising a third optoelectronic device in said semiconductor layer below said first optoelectronic device comprising said Pockels material.

16. The photonics structure of claim 15, wherein said third optoelectronic device is a silicon (Si) waveguide.

17. The photonics structure of claim 10, wherein said semiconductor layer is a top semiconductor layer of a semiconductor-on-insulator (SOI) substrate.

18. The photonics structure of claim 10, wherein said at least one dielectric comprises a dielectric filler around a side of said Pockels material and a dielectric segment over said Pockels material.

19. The photonics structure of claim 18, wherein said dielectric filler and said dielectric segment have substantially coplanar top surfaces.

* * * * *

UNITED STATES PATENT AND TRADEMARK OFFICE
CERTIFICATE OF CORRECTION

Page 1 of 1

PATENT NO. : 12,248,206 B2
APPLICATION NO. : 17/975090
DATED : March 11, 2025
INVENTOR(S) : Preisler et al.

It is certified that error appears in the above-identified patent and that said Letters Patent is hereby corrected as shown below:

In the Claims

Column 12, Lines 7 and 8, "have substantially coplanar bottom surfaces further including a second optoelectronic device not comprising Pockels material" should be -- have substantially coplanar bottom surfaces --.

Signed and Sealed this
Nineteenth Day of August, 2025

Coke Morgan Stewart
*Acting Director of the United States Patent and Trademark Office*